(12) United States Patent
Naito et al.

(10) Patent No.: US 6,704,008 B2
(45) Date of Patent: Mar. 9, 2004

(54) NON-UNIFORMITY CORRECTION FOR DISPLAYED IMAGES

(75) Inventors: Keijiro Naito, Nagano (JP); Toru Aoki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 361 days.

(21) Appl. No.: 09/767,886

(22) Filed: Jan. 24, 2001

(65) Prior Publication Data

US 2002/0075277 A1 Jun. 20, 2002

(30) Foreign Application Priority Data

Jan. 26, 2000 (JP) ........................................ 2000-021732

(51) Int. Cl.$^7$ ................................................ G09G 3/00
(52) U.S. Cl. ........................ 345/207; 345/690; 345/89; 348/657; 348/744
(58) Field of Search ................................ 345/207, 690, 345/87–104; 348/655–658, 778, 790, 761, 766, 745, 744

(56) References Cited

U.S. PATENT DOCUMENTS

| | | | | | |
|---|---|---|---|---|---|
| 5,293,224 A | * | 3/1994 | Ajima | ........................ | 348/656 |
| 5,452,019 A | * | 9/1995 | Fukuda et al. | ............... | 348/655 |
| 5,510,851 A | * | 4/1996 | Foley et al. | ................. | 348/658 |
| 5,793,344 A | * | 8/1998 | Koyama | ........................ | 345/87 |
| 5,838,396 A | * | 11/1998 | Shiota et al. | ................ | 348/745 |
| 6,043,797 A | * | 3/2000 | Clifton et al. | ............... | 348/655 |
| 6,081,254 A | * | 6/2000 | Tanaka et al. | ............... | 345/207 |
| 6,570,611 B1 | * | 5/2003 | Satou et al. | ................. | 348/189 |

FOREIGN PATENT DOCUMENTS

| | | |
|---|---|---|
| JP | 4-31120 | 3/1992 |
| JP | 05-080101 | 4/1993 |
| JP | 07-181911 | 7/1995 |
| JP | 08-160883 | 6/1996 |
| JP | 09-251276 | 9/1997 |
| WO | WO 98/40871 | 9/1998 |

* cited by examiner

*Primary Examiner*—Lun-Yi Lao
(74) *Attorney, Agent, or Firm*—Oblon, Spivak, McClelland, Maier & Neustadt, P.C.

(57) ABSTRACT

An image display apparatus including an image correction section, a data storage device, and an image forming section. The image correction section corrects levels of given image data in accordance with the correction data stored in the data storage device. The image forming section is provided with a plurality of pixels each transmitting image-forming light responsive to corrected image data supplied from the image correction section, and the image-forming light reproduces a displayed image. The correction data are determined by obtaining data-correction values based on input-output characteristics of the image forming section. The data-correction values represent correction amounts of the image data needed to bring, closer to a predetermined reference level, the output levels of light at a plural locations of a displayed image which is displayed responsive to uniform image data representing a specific uniform image.

25 Claims, 6 Drawing Sheets

NON-UNIFORMITY CORRECTION FOR DISPLAYED IMAGES

BACKGROUND OF THE INVENTION

1. Field of the Invention

The present invention relates to the correction of non-uniformities in images displayed by an image display apparatus.

2. Description of the Related Art

Various types of image display apparatus have been developed, such as direct-viewing display apparatus and projection-type display apparatus (projectors). Direct-viewing display apparatuses include liquid-crystal panels, plasma display panels (PDPs), CRTs, and other display apparatuses in which the screen of the display device is viewed directly. Projectors are provided with projection lens or optical systems and designed for projecting images formed on display devices, such as liquid-crystal panels, Digital Micromirror Devices (registered trade mark of Texas Instrument), and CRTs, and viewing the images thus projected.

Images displayed by an image display apparatus are preferably uniform images devoid of color non-uniformities or color shift. In reality, however, displayed images sometimes have color non-uniformities due to the variation of input-output characteristics of display devices, electrical characteristics of constituent circuits, and optical characteristics of optical devices.

In conventional practice, image data related to pixels having such color non-uniformities are corrected in order to control these color non-uniformities. Correction data for correcting such image data may, for example, be obtained in the following manner. A uniform middle-tone image such as a uniform gray image is first displayed. The displayed image is photographed with a image camera or measured with a luminance meter, and the distribution of color non-uniformities is measured. Suitable correction data are then obtained while repeated adjustments are made to the image data related to the pixels having the color non-uniformities, and the color non-uniformities are repeatedly measured.

Determining correction data for controlling color non-uniformities in accordance with prior art is disadvantageous, however, in that considerable time is needed to determine the correction data because image data must be repeatedly adjusted and color non-uniformities measured in order to obtain suitable values.

SUMMARY OF THE INVENTION

An object of the present invention is to makes it easier to determine correction data for correcting the non-uniformities of displayed images.

In order to attain at least part of the above and other related objects of the present invention, there is provided a method of adjusting operation of an image display apparatus. The image display apparatus comprises: an image correction section configured to correct levels of given image data in accordance with correction data; a data storage device configured to store the correction data; and an image forming section provided with a plurality of pixels each emitting image-forming light responsive to corrected image data supplied from the image correction section, the image-forming light reproducing a displayed image. The adjustment method comprises the steps of: (a) providing input-output characteristic data of the image forming section; (b) supplying uniform image data representing a specific uniform image to the image display apparatus and measuring an output level of light at a plurality of locations on a displayed image; (c) determining data-correction values corresponding to the output levels of measured light, respectively, on the basis of the input-output characteristic data of the image forming section, the data-correction values indicative of correction amounts of image data needed to bring each of the output levels of measured light closer to a predetermined reference level; (d) determining, on the basis of the data-correction values corresponding to the output levels of measured light, the correction data which are to be used in reproducing the data-correction values with respect to the pixels of the image forming section; and (e) storing the correction data thus determined in the data storage device of the image display apparatus.

According to the above-described adjustment method, the correction data can be easily determined on the basis of the input-output characteristics of the image forming section.

The correction data stored in the data storage device may represent the data-correction values with respect to not all but only some of the pixels of the image forming section. In this case, the data-correction values with respect to all of the pixels of the image forming section are determined on the basis of the correction data.

According to this arrangement, the data-correction values pertaining to all the pixels of the image forming section can be easily obtained based on the correction data related to the data-correction values for only part of the image forming section.

The present invention is also directed to an image adjustment system for adjusting operation of the image display apparatus. The image adjustment system comprises: a image signal feeder configured to feed image signals containing the image data to the image display apparatus; a measurement instrument configured to measure an output level of light at a plurality of locations on an image displayed by the image display apparatus; and an adjustment device configured to determine correction data representing data-correction values indicative of correction amounts of image data for each pixel of the image forming section, on the basis of measurements results of the measurement instrument, and storing the correction data into the data storage device. The adjustment device determines the data-correction values on the basis of input-output characteristics of the image forming section, where the data-correction values represent correction amounts of the image data needed to bring, closer to a predetermined reference level, the output levels of measured light measured at the plural locations of the displayed image which is displayed responsive to uniform image data representing a specific uniform image.

These and other objects, features, aspects, and advantages of the present invention will become more apparent from the following detailed description of the preferred embodiments with the accompanying drawings.

DESCRIPTION OF THE PREFERRED EMBODIMENT

A. Structure of Image Display Apparatus

Figure 1:
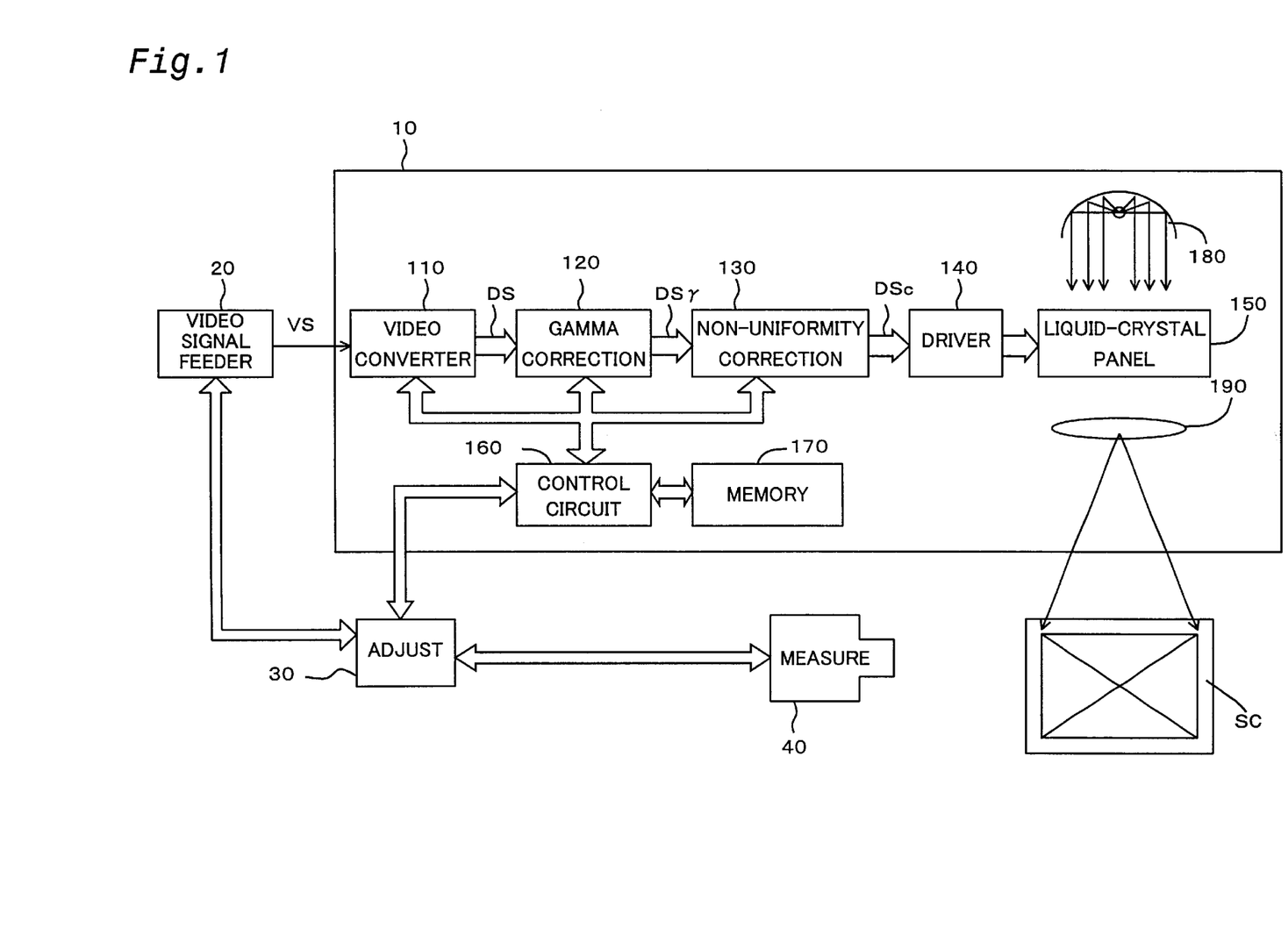
FIG. 1 is a block diagram outlining the structure of an image adjustment system representing an embodiment of the present invention.

FIG. 1 is a block diagram showing the general structure of an image adjustment system embodying the present invention. The image adjustment system comprises an image display apparatus 10, a image signal feeder 20, an adjustment device 30, and a measurement instrument 40.

The image display apparatus 10 is a projector which projects and displays images represented by image signals, which are fed from the image signal feeder 20, on a screen SC.

The measurement instrument 40 measures an output level of light emitted by the image displayed on the screen SC. The measurement instrument 40 may be a image camera, a luminance meter, a photometer, or a colorimeter.

The adjustment device 30 is connected to the image signal feeder 20, the measurement instrument 40, and a control circuit 160 of the image display apparatus 10. The adjustment device 30 determines non-uniformity correction data on the basis of the image data fed from the image signal feeder 20 and the output data of the measurement instrument 40 (for example, radiance data) indicating the intensity of light. The processing by the adjustments device 30 will be described later in detail. The correction data thus obtained are stored in a memory 170 via the control circuit 160 of the image display apparatus 10.

B. Structure of Image Display Apparatus 10

The image display apparatus 10 comprises an image converter 110, a gamma correction circuit 120, a non-uniformity correction circuit 130, a liquid-crystal panel driver 140, liquid-crystal panels 150, a control circuit 160, and a memory 170. The image display apparatus 10 further comprises an optical illumination system 180 for illuminating the liquid-crystal panels 150, and an optical projection system 90 for projecting modulated light (occasionally referred to as "image light") transmitted by the liquid-crystal panels 150 onto the screen SC.

The liquid-crystal panels 150 are used as light valves or optical modulators for modulating, in accordance with image signals, illumination light emitted by the optical illumination system 180. Although this is not shown in the drawing, the image display apparatus 10 has three liquid-crystal panels 150 for three colors (RGB). In addition, the circuits 110 to 140 are each capable of processing image signals corresponding to the three colors.

The optical illumination system 180 has a colored light separating optical system for separating the light emitted by a light source into three colors. The optical projection system 190 has a light synthesizing optical system for synthesizing three-colored image light and creating color image light that represents color images. The structure of the optical system of such a projector is disclosed in detail, for example, in U.S. Pat. No. 5,973,840, the disclosure of which is hereby incorporated by reference for all purposes.

The control circuit 160 includes a CPU and controls the operation of the image display apparatus 10. The control circuit 160 is connected via a bus to the image converter 110, gamma correction circuit 120, and non-uniformity correction circuit 130, and is used to control the processing operation of the respective circuits. The image display apparatus 10 is connected to the external equipment including the adjustment device 30 via the control circuit 160.

The image converter 110 converts an input image signal VS into an image signal DS that can be input to the liquid-crystal panel 150. The image signal DS includes a clock signal and timing signals containing vertical and horizontal synchronizing signals. The image signal DS also includes image data of 24 bits per pixel which are continuously output for each pixel. The image data of a single pixel are composed of eight bits of color data for each color of R, G, and B. For the sake of convenience, the image data contained in the image signal DS may be referred to as "image data DS." Also, the image signal alone, without the timing signals, may be referred to as "the image signal DS."

The gamma correction circuit 120 corrects the image data DS such that the input-output characteristics of the liquid-crystal panel 150 is a linear function. The input-output characteristics of the liquid-crystal panel 150 may be also referred to as "V–T characteristics." This type of correction is referred to as "gamma correction" because the input-output characteristics of the liquid-crystal panel 150 typically show $\gamma$ characteristic attributes. The term "V–T correction" may also be used. The gamma correction circuit 120 performs the gamma correction on the basis of the input-output characteristic data stored in the memory 170. The input-output characteristic data are supplied from the adjustment device 30, and stored in the memory 170 via the control circuit 160, as described later. The memory 170 is a nonvolatile memory such as EPROM, EEPROM, and FRAM.

The non-uniformity correction circuit 130 corrects the gamma-corrected image data DS$\gamma$ to reduce the color non-uniformities in the images displayed on the screen SC. In this embodiment, color non-uniformities are corrected by adding correction data, e.g., at least one data-correction value, to the image data DS$\gamma$. This type of correction will be referred to as "color non-uniformity correction." This color non-uniformity correction is described later in detail.

The liquid-crystal panel driver 140 supplies the corrected image data DSc in synchronism with the timing signals to the liquid-crystal panel 150.

The liquid-crystal panels 150 form images of respective colors responsive to the image data DSc, thereby modulating illumination light from the optical illumination system 180. The optical projection system 190 projects the modulated light or image light onto the screen SC. The images are thereby displayed on the screen SC.

In this embodiment, the liquid-crystal panel driver 140 and liquid-crystal panel 150 correspond to the image forming section of the present invention, and the non-uniformity correction circuit 130 corresponds to an image correction section. In addition, the control circuit 160 and memory 170 correspond to a data storage.

C. Color Non-uniformity Correction

Figure 2:
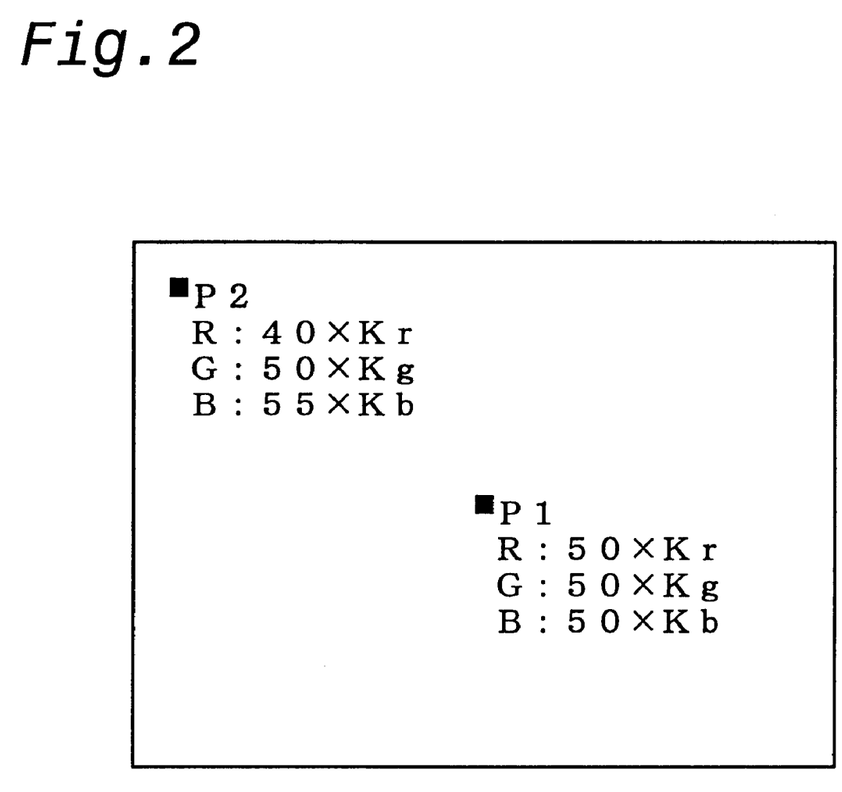
FIG. 2 illustrates an example in which an image is obtained by displaying a uniform gray image without a color non-uniformity correction.

The method of correcting color non-uniformities in the non-uniformity correction circuit 130 will now be described. FIG. 2 illustrates an example of an image obtained by displaying a uniform gray image without color non-uniformity correction. It is assumed that the image data D for each color component consists of eight-bit multi-tone data, that is, integers from 0 to 255. In this case, the radiance level of component R is assumed to be D×(100Kr/255), that is, in the range of 0Kr to 100Kr. Here, Kr is a coefficient. Similarly, the radiance level of component G is in the range of 0 Kg to 100 Kg, and the radiance level of component B is in the range of 0 Kb to 100 Kb. Here, the coefficients Kr, Kg, and Kb are contribution ratios of each color to the radiance of synthetic light, with Kr≈0.299, Kg≈0.587, and Kb≈0.114. The coefficients Kr, Kg, and Kb are occasionally omitted hereinbelow because the coefficients Kr, Kg, and Kb may be ignored when relative radiance levels of pixels for the same color component are considered.

It is assumed that the tone data for a gray image is 128 each for R, G, and B and that the corresponding radiance levels of the light R, G, and B are 50Kr, 50 Kg, and 50 Kb, respectively. These radiance levels are hereinafter referred to as "reference radiance levels."

In FIG. 2, the radiance levels of the area corresponding to pixel P1 are equal to the reference radiance levels. The radiance levels of the area corresponding to pixel P2, on the other hand, are 40Kr for R, 50 Kg for G, and 55 Kb for B. The pixel P2 shows color non-uniformity. The color non-uniformity of pixel P2 are reduced as described below.

In order to reduce the color non-uniformity of pixel P2, the given image data is corrected such that the radiance level of each color component for pixel P2 becomes equal to the corresponding reference radiance level. For example, the radiance level of component R is 40Kr, which is less than the reference radiance level of 50Kr, so calculations are performed to determine the correction data or data-correction value needed to compensate for the radiance level deficit of 10Kr. Component R of pixel P2 can be corrected by adding these correction data to image data. In addition, the radiance level of component B is 55 Kb, which is greater than the reference radiance level of 50 Kb, so component B of pixel P2 can be corrected in the same manner by reducing the value of image data.

Figure 3:
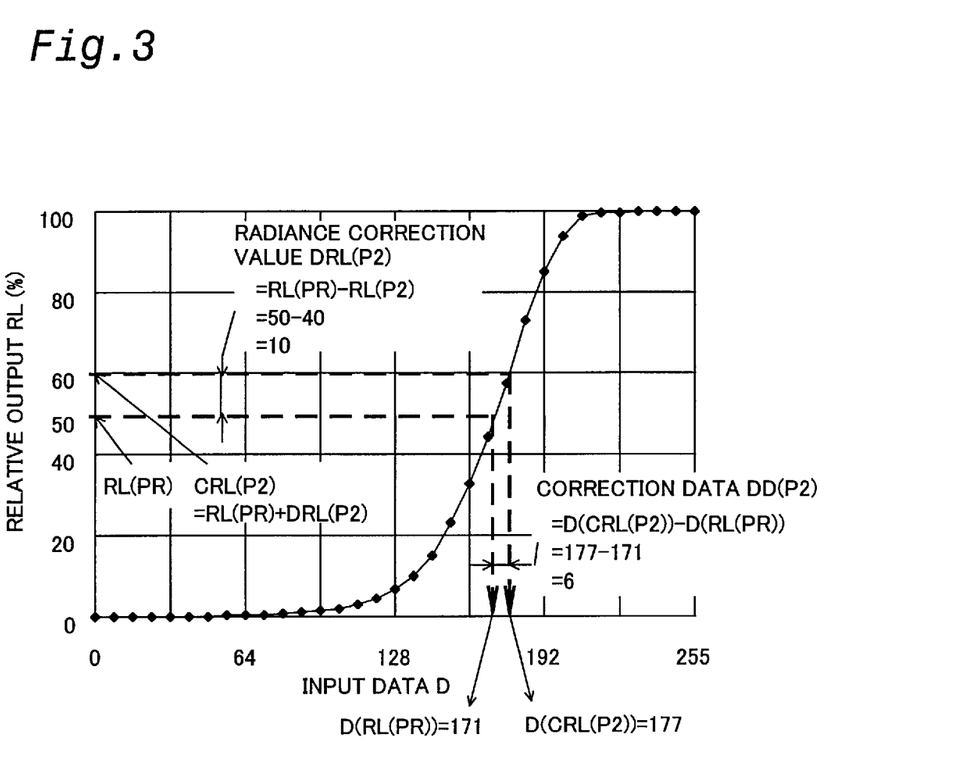
FIG. 3 shows a method for determining correction data.

Correction data can be readily obtained using the input-output characteristics of the liquid-crystal panel 150. FIG. 3 illustrates the input-output characteristics of the liquid-crystal panel 150 for R component.

Radiance correction value DRL(P2) for component R of pixel P2 is first calculated from Equation (1).

$$DRL(P2)=RL(PR)-RL(P2) \tag{1}$$

where RL(PR) is the reference radiance level for component R, and RL(P2) is the radiance level for component R of pixel P2. In the example shown in FIG. 2, DRL(P2)=+10 because RL(PR)=50 and RL(P2)=40.

In correction of image data, the radiance of component R is corrected to be increased by the correction value DRL (P2). Consequently, the corrected radiance level CRL(P2) for component R of pixel P2 can be written as Equation (2).

$$CRL(P2) = RL(PR) + DRL(P2) \tag{2}$$
$$= RL(PR) + \{RL(PR) - RL(P2)\}$$

In the example shown in FIG. 2, CRL(P2)=60 because RL(PR)=50 and DRL(P2)=+10 (FIG. 3).

The input-output characteristics curve is then used to determine the uncorrected input data D(RL(PR)) corresponding to reference radiance level RL(PR), and to determine the corrected input data D(CRL(P2)) corresponding to corrected radiance level CRL(P2) of pixel P2. In the example shown in FIG. 3, D(RL(PR))=171 and D(CRL(P2))=177.

The data-correction value DD(P2) for component R of pixel P2 is given by the difference between the uncorrected and corrected input data, as indicated by Equation (3).

$$DD(P2)=D(CRL(P2))-D(RL(PR)) \tag{3}$$

where D(x) denotes the input value of image data corresponding to the output value x. In the example shown in FIG. 3, DD(P2)=+6.

As can be seen in FIG. 2, the actual radiance level RL(P2) of pixel P2 is 40 when the uncorrected input data D(RL(PR))=171 corresponding to the reference radiance level RL(PR)=50 are input to the liquid-crystal panel driver 140 (FIG. 1). Meanwhile, inputting the corrected input data D(CRL(P2))=177 to the liquid-crystal panel driver 140 increases the radiance level by about 10 to about 50, making this level substantially equal to the reference radiance level RL(PR). Consequently, the non-uniformity correction circuit 130 corrects input data DSγ(P2) in accordance with Equation (4) to obtain corrected input data DSc(P2).

$$DSc(P2)=DS\gamma(P2)+DD(P2) \tag{4}$$

If the non-uniformity correction circuit 130 is composed of a multiplication circuit in which the level of image data is amplified according to the data-correction value, the correction data is set as the multiplier coefficient of the multiplication circuit. In this case, the data-correction value DD' is calculated using Equation (5) below instead of Equation (3).

$$DD'(P2)=D(CRL(P2))/D(RL(PR)) \tag{5}$$

In addition, the corrected input data DSc' are calculated using Equation (6) below instead of Equation (4).

$$DSc'(P2)=DS\gamma(P2)\times DD'(P2) \tag{6}$$

The correction data of component B for pixel P2 can be obtained in the same manner as in the case of component R by using the input-output characteristics of the liquid-crystal panel 150 for component B. The same applies to the correction data of the color non-uniformities in other pixels. Correction data related to all color components are obtained in this manner for all the pixels of the liquid-crystal panel 150.

Alternatively, single input-output characteristic data expressing the output characteristics of light responsive to monochromatic input image data, that is, the input-output characteristics of light synthesized by three liquid-crystal panels, can be commonly used for all of the color components instead of the use of the respective input-output characteristic data of the liquid-crystal panels for respective color components.

The correction data obtained by the above method are stored in the memory 170, and the correction data corresponding to each pixel are input to the non-uniformity correction circuit 130 via the control circuit 160.

Thus the correction data for reducing color non-uniformities can be readily obtained using the input-output characteristic data of the liquid-crystal panels in this manner. The above description is given with reference to an example in which correction data are obtained such that the radiance level of each color is equalized with a reference radiance level, but the correction data can be obtained in various ways such that the correction data represent variations in the output level of light. For example, the present invention may be applied to a case in which one of the three color components is adopted as a point of reference, and correction data are obtained for each pixel such that the radiance levels of the other color components are made equal to that of the reference color component, thereby causing all pixels to have the same chromaticity.

Figure 4:
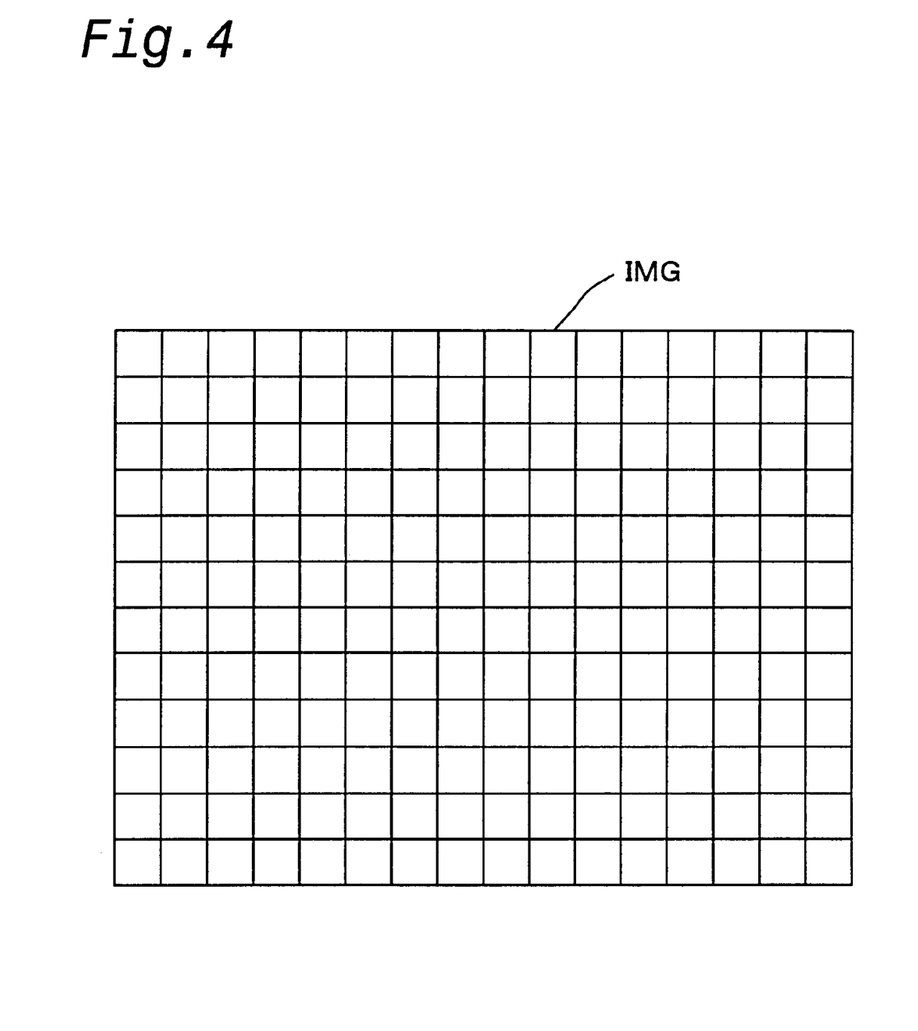
FIG. 4 shows a plurality of blocks for setting correction data.

Some time is needed to set and store correction data when a data-correction value is obtained for each pixel and is stored as correction data in the memory 170. The required capacity of the memory 170 is also increased. In view of this, it is possible to adopt an approach in which the entire displayed image IMG is divided into a plurality of blocks and correction data are set for each block, as shown in FIG. 4. In this example, a single block (area) is several tens of pixels on a side. A rectangular shape is not the only option for the block configuration. All the pixels may also be divided using blocks having a plurality of configurations. It is also possible to adopt an approach in which the data-correction values of typical pixels in a block are obtained, the results are stored in the memory 170, and the non-uniformity correction circuit 130 determines correction data for each of the pixels inside a block on the basis of these data-correction values. Various interpolation method such as linear interpolation, and weight-average interpolation can be applied to this approach in order to determine the correction data.

D. Setting of Color Non-uniformity Correction Data

Figure 5:
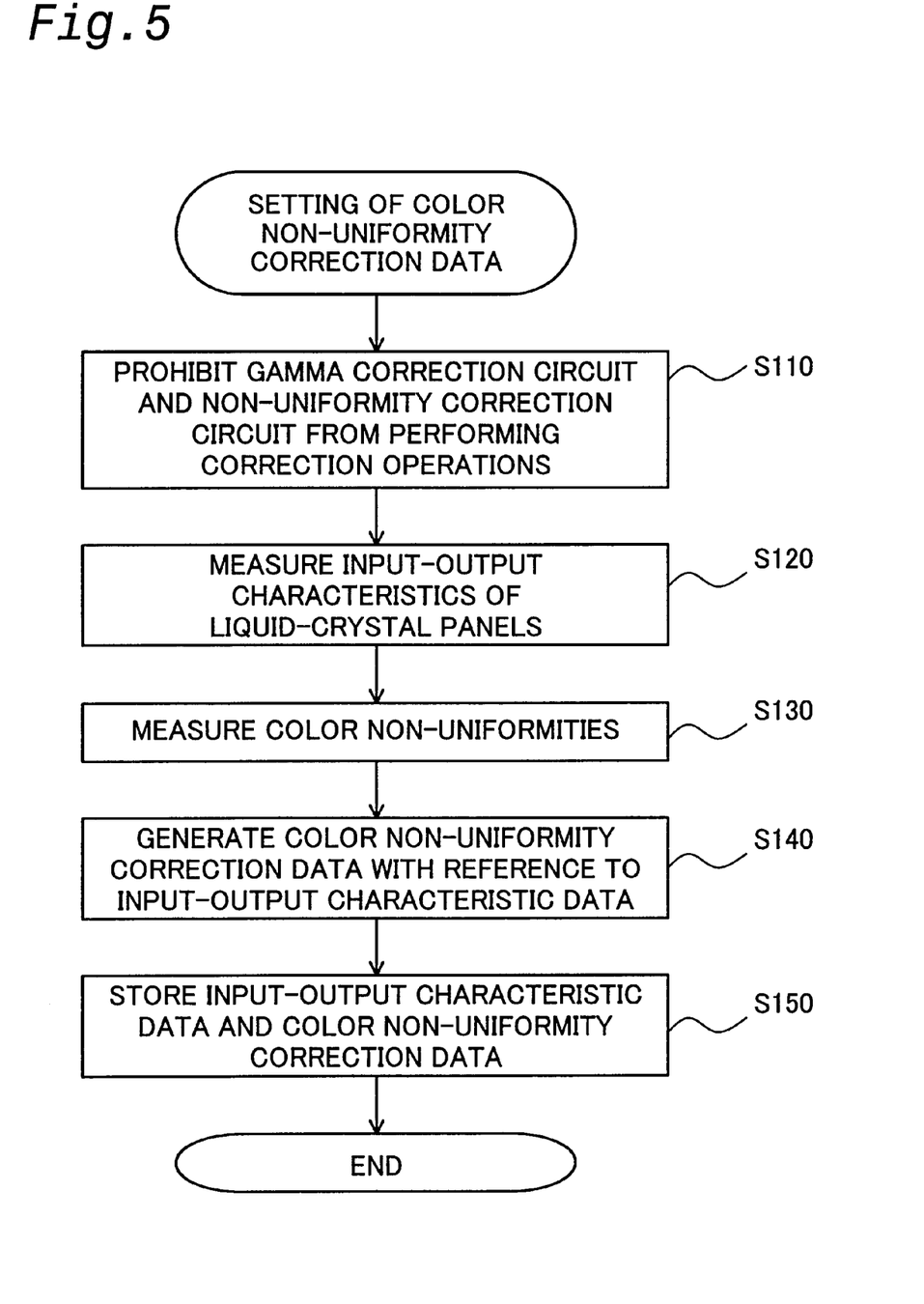
FIG. 5 is a flowchart of a process for setting color non-uniformity correction data.

Color non-uniformity correction data are set and stored in the memory 170 in accordance with the following procedure by making use of the image adjustment system shown in FIG. 1. FIG. 5 is a flowchart showing the process of setting the color non-uniformity correction data. In step S110, the adjustment device 30 forbids correction operations in the gamma correction circuit 120 and non-uniformity correction circuit 130 via the control circuit 160. In step S120, the input-output characteristics of the liquid-crystal panels 150 are measured. The input-output characteristics of the liquid-crystal panels 150 are obtained by varying the image data supplied from the image signal feeder 20 and using the measurement instrument 40 to measure the output characteristics of light for the images displayed on the screen SC. The input-output characteristics may be measured for each of the three liquid-crystal panels, or alternatively they may be measured on the basis of the total output characteristics of light from the three liquid-crystal panels responsive to monochromatic multi-tone image data, that is, on the output characteristics of synthesized light emitted by the three liquid-crystal panels 150. The output characteristic data measured by the measurement instrument 40 are input to the adjustment device 30 to produce the input-output characteristic data indicative of the relationship between the input image data and the corresponding output data.

Color non-uniformities are subsequently measured in step S130. The color non-uniformities can be measured by displaying a uniform gray image and measuring the output characteristic of light output by a target pixel or block for measurement. Measurement data related to color non-uniformities are input to the adjustment device 30. In step S140, the color non-uniformity correction data are determined with reference to the input-output characteristic data of the liquid-crystal panels 150 in the manner described before. In step S150, the color non-uniformity correction data obtained from the adjustment device 30 are stored together with the input-output characteristic data of the liquid-crystal panels 150 in the memory 170 via the control circuit 160. The color non-uniformity correction data can be set in accordance with the above-described procedure. Before color non-uniformities are measured in step S130, the input-output characteristic data of the liquid-crystal panels 150 may be stored in the memory 170, and the gamma correction circuit 120 may be allowed to perform gamma correction operations before the beginning of step S130.

Figure 6:
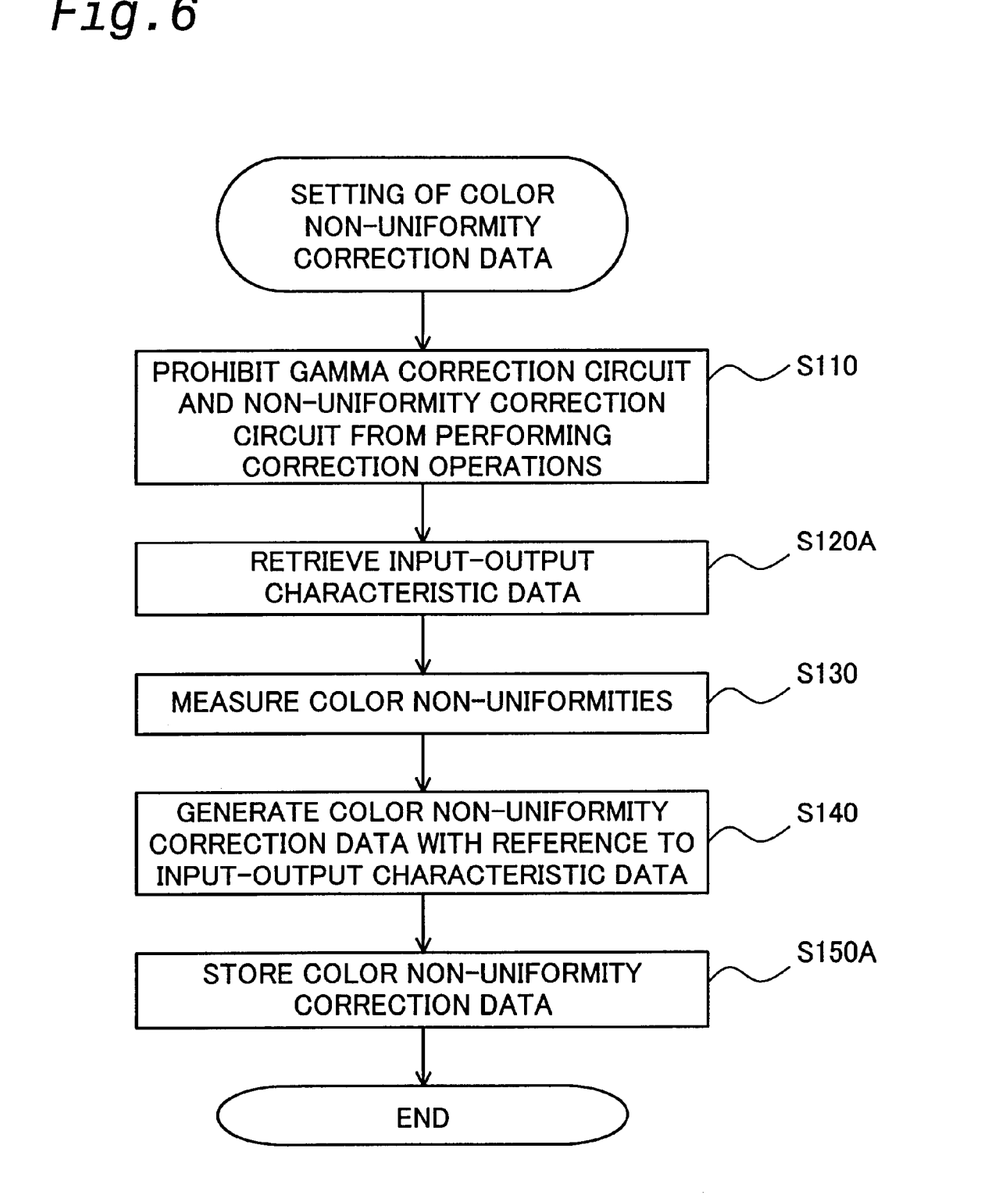
FIG. 6 is a flowchart of another process for setting color non-uniformity correction data.

Color non-uniformity correction data may also be set in accordance with the following procedure using the image adjustment system shown in FIG. 1. FIG. 6 is a flowchart showing another procedure of setting the color non-uniformity correction data. This procedure is the same as that shown in FIG. 5 except that steps S120 and S150 in FIG. 5 are replaced with steps 120A and 150A, respectively. In step S120A the input-output characteristic data, which are measured in advance and stored in the memory 170, are retrieved via the control circuit 160 without measuring them on the spot. In step S150A the correction data generated in step S140 are supplied from the adjustment device 30 to the memory 170 via the control circuit 160 to be stored in the memory 170.

Whereas the procedure of FIG. 5 includes a series of steps for measuring the input-output characteristics of liquid-crystal panels and calculating color non-uniformity correction data, the procedure of FIG. 6 is carried out such that the correction data is calculated using the input-output characteristics of liquid-crystal panels which are measured in advance and stored in the memory 170. The procedure of FIG. 5 may, for example, be adapted to a case in which various adjustments are performed as a series of operations during the assembly of the image display apparatus 10. The procedure of FIG. 6 may be adapted to a case in which the determination of the correction data is carried out separately after that measurement of the input-output characteristics of the liquid-crystal panels 150, which is required for the gamma correction. For example, the procedure of Fir. 6 may be used for the correction of color non-uniformities when the image display apparatus 10 is set up in an actual operating site after being shipped.

Although the above setting procedures were described with reference to cases in which uniform gray images were displayed and color non-uniformities measured, images of other colors may also be used. The images used in the setting procedures are preferably uniform images containing non-zero values for the three color components R, G, and B.

Because it is difficult to measure the light output level of each pixel with the measurement instrument 40, it is possible to adopt an approach in which, for example, light intensity is measured for a pixel block including a plurality of pixels to be measured, and the output level thus measured is assumed to be that of specific pixel or pixels from within the pixel block.

Although the correction data for reducing color non-uniformities are determined with respect to a single uniform image of a predetermined tone level in the above embodiments, they may be determined with respect to a plurality of uniform images of various tone levels. In this case, one of plural sets of the correction data for the various tone levels is used to correct color non-uniformity for each pixel within the displayed image according to the input image data for each pixel.

E. Modifications

E1. Modification 1:

The above embodiments are described with reference to reducing color non-uniformities in a color image display apparatus, but the present invention is also applicable to reducing radiance non-uniformities in an monochromatic image display apparatus.

E2. Modification 2:

The above embodiments are described with reference to a case in which the image display apparatus 10 is constructed as a projector, but the present invention is also applicable to a direct-viewing image display apparatus.

E3. Modification 3:

The above embodiments are described with reference to the use of transmission-type liquid-crystal panels, but the present invention is also applicable to an image display apparatus equipped with reflective liquid-crystal panels, digital micromirror devices, plasma display panels, CRTs, and various other display devices.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of adjusting operation of an image display apparatus including: an image correction section configured to correct levels of given image data in accordance with correction data; a data storage device configured to store the correction data; and an image forming section provided with a plurality of pixels each emitting image-forming light responsive to corrected image data supplied from the image correction section, the image-forming light reproducing a displayed image, the method comprising:

(a) providing input-output characteristic data of the image forming section;
   (b) supplying uniform image data representing a specific uniform image to the image display apparatus and measuring an output level of light at a plurality of locations on a displayed image;
   (c) determining data-correction values corresponding to the output levels of measured light, respectively, based on the input-output characteristic data of the image forming section, the data-correction values indicative of correction amounts of image data needed to bring each of the output levels of measured light to a predetermined reference level;
   (d) determining, based on the data-correction values corresponding to the output levels of measured light, the correction data which are to be used in reproducing the data-correction values with respect to the plurality of pixels of the image forming section; and
   (e) storing the correction data thus determined in the data storage device of the image display apparatus,
   wherein a data-correction value DD(P) for an arbitrary location P is determined by first calculating CRL(P)=RL(PR)+{RL(PR)−RL(P)}, wherein CRL(P) denotes a corrected output level of light at the location P that is to be obtained by the correction data, RL(PR) denotes the predetermined reference level, and RL(P) denotes an output level of light at the location P before the correction.

2. A method in accordance with claim 1, wherein the correction data stored in the data storage device represent the data-correction values with respect to some of the pixels of the image forming section, and wherein the method further comprises:

(f) determining the data-correction values with respect to all of the pixels of the image forming section based on the correction data.

3. A method in accordance with claim 2, wherein the step (f) includes determining the data-correction values with respect to all of the pixels of the image forming section through interpolation of the data-correction values represented by the correction data.

4. A method in accordance with claim 1, wherein the step (b) is performed while operation of the image correction section is prohibited.

5. A method in accordance with claim 1, wherein the image display apparatus comprises three of the image forming sections for R, G, and B color components, and wherein the correction data is prepared for each of the three image forming sections.

6. A method in accordance with claim 5, wherein the specific uniform image is a gray image represented by the R, G, and B color components.

7. A method in accordance with claim 1, wherein the data-correction value DD(P) is given by:

$$DD(P)=D(CRL(P))-D(RL(PR)),$$

wherein D(x) denotes an input value of the image data given to the image forming section corresponding to an output value x of the image forming section according to the input-output characteristics.

8. A method in accordance with claim 1, wherein the data-correction value DD(P), for an arbitrary location P, is given by:

$$DD(P)=D(CRL(P))/D(RL(PR)), \text{ and}$$

wherein D(x) denotes an input value of the image data given to the image forming section corresponding to an output value x of the image forming section according to the input-output characteristics.

9. An image adjustment system for adjusting operation of an image display apparatus comprising: an image correction section configured to correct levels of given image data in accordance with correction data; a data storage device configured to store the correction data; and an image forming section provided with a plurality of pixels each emitting image-forming light responsive to corrected image data supplied from the image correction section, the image-forming light reproducing a displayed image, the image adjustment system comprising:

an image signal feeder configured to feed image signals including the image data to the image display apparatus;
   a measurement instrument configured to measure an output level of light at a plurality of locations on an image displayed by the image display apparatus; and
   an adjustment device configured to determine correction data representing data-correction values indicative of correction amounts of image data for each pixel of the image forming section, based on measurement results of the measurement instrument, and to store the correction data into the data storage device,
   the adjustment device determining the data-correction values based on input-output characteristics of the image forming section, the data-correction values representing correction amounts of the image data needed to bring, to a predetermined reference level, the output levels of measured light measured at the plurality of locations of the displayed image that is displayed responsive to uniform image data representing a specific uniform image,
   wherein a data-correction value DD(P) for an arbitrary location P is determined by first calculating CRL(P)=RL(PR)+{RL(PR)−RL(P)}, wherein CRL(P) denotes a corrected output level of light at the location P that is to be obtained by the correction data, RL(PR) denotes the predetermined reference level, and RL(P) denotes an output level of light at the location P before the correction.

10. An image adjustment system in accordance with claim 9, wherein:

the correction data stored in the data storage device represent the data-correction values with respect to some of the plurality of pixels of the image forming section; and the image correction section determines the data-correction values with respect to all of the pixels of the image forming section based on the correction data.

11. An image adjustment system in accordance with claim 10, wherein the image correction section determines the data-correction values with respect to all of the pixels of the image forming section through interpolation of the data-correction values represented by the correction data.

12. An image adjustment system in accordance with claim 9, wherein the measurement of the output levels of light at the plurality of locations of the displayed image responsive to the uniform image data is performed while operation of the image correction section is prohibited.

13. An image adjustment system in accordance with claim 9, wherein the image display apparatus comprises three of the image forming sections for R, G, and B color components, and wherein the correction data is prepared for each of the three image forming sections.

14. An image adjustment system in accordance with claim 13, wherein the specific uniform image is a gray image represented by the R, G, and B color components.

15. An image adjustment system in accordance with claim 9, wherein the data-correction value DD(P) is given by:

$$DD(P)=D(CRL(P))-D(RL(PR)),$$

wherein D(x) denotes an input value of the image data given to the image forming section corresponding to an output value x of the image forming section according to the input-output characteristics.

16. An image adjustment system in accordance with claim 9, wherein the data-correction value DD(P) is given by:

$$DD(P)=D(CRL(P))/D(RL(PR)),$$

wherein D(x) denotes an input value of the image data given to the image forming section corresponding to an output value x of the image forming section according to the input-output characteristics.

17. An image display apparatus, comprising:

an image correction section configured to correct levels of given image data in accordance with correction data;

a data storage device configured to store the correction data; and an image forming section provided with a plurality of pixels each emitting image-forming light responsive to corrected image data supplied from the image correction section, the image-forming light reproducing a displayed image, wherein the correction data are determined by obtaining data-correction values based on input-output characteristics of the image forming section, the data-correction values representing correction amounts of the image data needed to bring, to a predetermined reference level, output levels of light at a plural locations of a displayed image that is displayed responsive to uniform image data representing a specific uniform image and wherein a data-correction value DD(P) for an arbitrary location P is determined by first calculating CRL(P)=RL(PR)+{RL(PR)−RL(P)}, wherein CRL(P) denotes a corrected output level of light at the location P that is to be obtained by the correction data, RL(PR) denotes the predetermined reference level, and RL(P) denotes an output level of light at the location P before the correction.

18. A method of adjusting operation of an image display apparatus including an image correction section configured to correct image data in accordance with a data-correction value; a data storage device configured to store the data-correction value; and an image forming section provided with a plurality of pixels each emitting light responsive to corrected image data supplied from the image correction section, the light reproducing a displayed image, the method comprising:

(a) providing input-output characteristic data of the image forming section;

(b) supplying uniform image data representing a uniform image to the image display apparatus and measuring a radiance level of an area on a displayed image represented by the uniform image data;

(c) determining the data-correction value corresponding to the radiance level based on the input-output characteristic data, the data-correction value indicative of a correction amount needed to bring the radiance level to a predetermined reference level; and (d) storing the data-correction value thus determined in the data storage device of the image display apparatus, wherein a data-correction value DD(P) for an arbitrary location P is determined by first calculating CRL(P)=RL(PR)={RL(PR)−RL(P)}, wherein CRL(P) denotes a corrected output level of light at the location P that is to be obtained by the correction data, RL(PR) denotes the predetermined reference level, and RL(P) denotes an output level of light at the location P before the correction.

19. A method in accordance with claim 18, wherein the area corresponds to one of the plurality of pixels of the image forming section.

20. A method in accordance with claim 18, wherein the area corresponds to not all but only some of the pixels of the image forming section.

21. A method of adjusting operation of an image display apparatus including an image correction section configured to correct image data in accordance with correction data; a data storage device configured to store the correction data; and an image forming section provided with a plurality of pixels each emitting light responsive to corrected image data supplied from the image correction section, the light reproducing a displayed image, the method comprising:

(a) providing input-output characteristic data of the image forming section;

(b) supplying uniform image data representing a uniform image to the image display apparatus and measuring a radiance level of an area on a displayed image represented by the uniform image data;

(c) determining a data-correction value corresponding to the radiance level based on the input-output characteristic data, the data-correction value indicative of a correction amount needed to bring the radiance level to a predetermined reference level;

(d) determining the correction data based on the data-correction value; and (e) storing the data-correction value thus determined in the data storage device of the image display apparatus, wherein a data-correction value DD(P) for an arbitrary location P is determined by first calculating CRL(P)=RL(PR)+{RL(PR)−RL(P)}, wherein CRL(P) denotes a corrected output level of light at the location P that is to be obtained by the correction data, RL(PR) denotes the predetermined reference level, and RL(P) denotes an output level of light at the location P before the correction.

22. A method in accordance with claim 21, wherein the area corresponds to one of the plurality of pixels of the image forming section.

23. A method in accordance with claim 21, wherein the area corresponds to not all but only some of the pixels of the image forming section.

24. An image adjustment system for adjusting operation of an image display apparatus including an image correction section configured to correct image data in accordance with a data-correction value; a data storage device configured to store the data-correction value; and an image forming section provided with a plurality of pixels each emitting light responsive to corrected image data supplied from the image correction section, the light reproducing a displayed image, the image adjustment system comprising:

an image signal feeder configured to feed image signals including the image data to the image display apparatus;

a measurement instrument configured to measure a radiance level of an area on an image displayed by the image display apparatus; and an adjustment device configured to determine the data-correction value based on a measurement result of the measurement instrument, and to store the data-correction value into the data storage device, the adjustment device determining the data-correction value based on input-output characteristics of the image forming section, the data-correction value representing a correction amount of the image data needed to bring, to a predetermined reference level, the radiance level of measured light measured at an area of the displayed image that is displayed responsive to uniform image data representing a specific uniform image, wherein a data-correction value DD(P) for an arbitrary location P is determined by first calculating CRL(P)=RL(PR)+{RL(PR)−RL(P)}, wherein CRL(P) denotes a corrected output level of light at the location P that is to be obtained by the correction data, RL(PR) denotes the predetermined reference level, and RL(P) denotes an output level of light at the location P before the correction.

25. A method of adjusting operation of an image display apparatus including an image correction section configured to correct image data in accordance with correction data; a data storage device configured to store the correction data; and an image forming section provided with a plurality of pixels each emitting light responsive to corrected image data supplied from the image correction section, the light reproducing a displayed image, the method comprising:

feeding image signals including the image data to the image display apparatus;

measuring a radiance level of an area on an image displayed by the image display apparatus; and determining correction data representing a data-correction value indicative of a correction amount of image data based on the measured radiance level, and storing the correction data into the data storage device, wherein the data-correction value is determined based on input-output characteristics of the image forming section, the data-correction value representing a correction amount of the image data needed to bring, to a predetermined reference level, the radiance level of measured light measured at an area of the displayed image that is displayed responsive to uniform image data representing a specific uniform image, and a data-correction value DD(P) for an arbitrary location P is determined by first calculating CRL(P)=RL(PR)+{RL(PR)−RL(P)}, wherein CRL(P) denotes a corrected output level of light at the location P that is to be obtained by the correction data, RL(PR) denotes the predetermined reference level, and RL(P) denotes an output level of light at the location P before the correction.

* * * * *